May 27, 1924.
J. B. WOOD ET AL
1,495,375
SAFETY HITCH
Filed July 6, 1922　　3 Sheets-Sheet 1
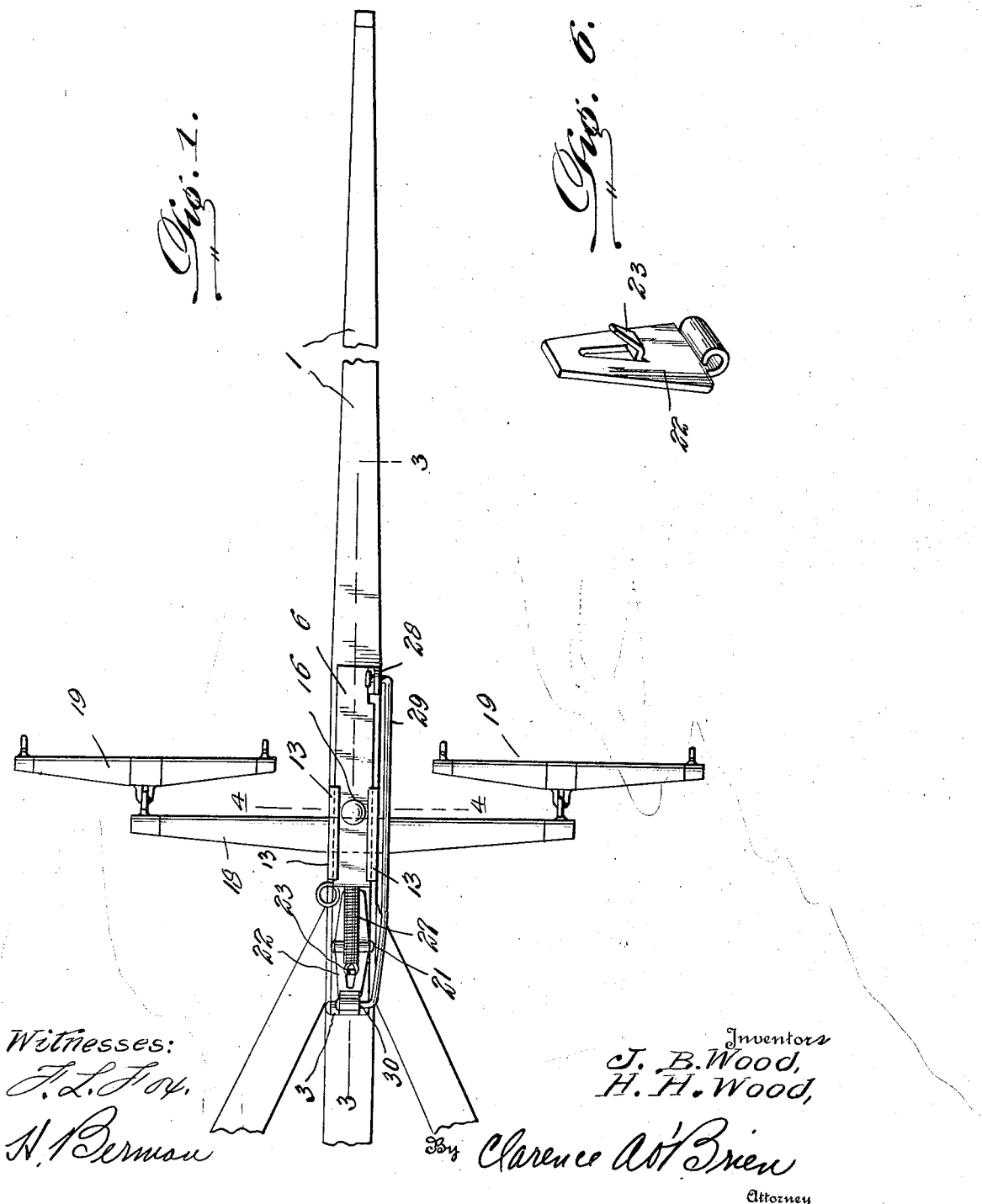

May 27, 1924.
J. B. WOOD ET AL
SAFETY HITCH
Filed July 6, 1922
1,495,375
3 Sheets-Sheet 2
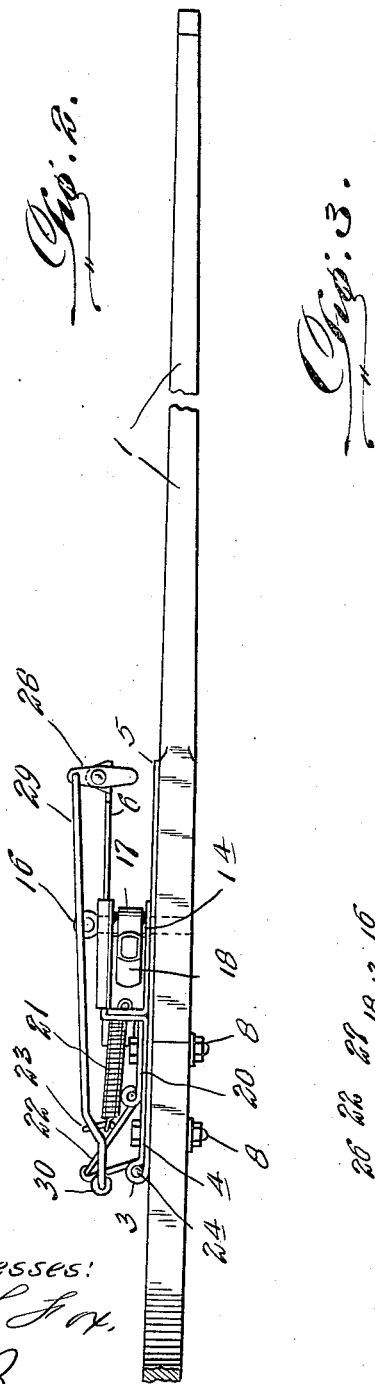
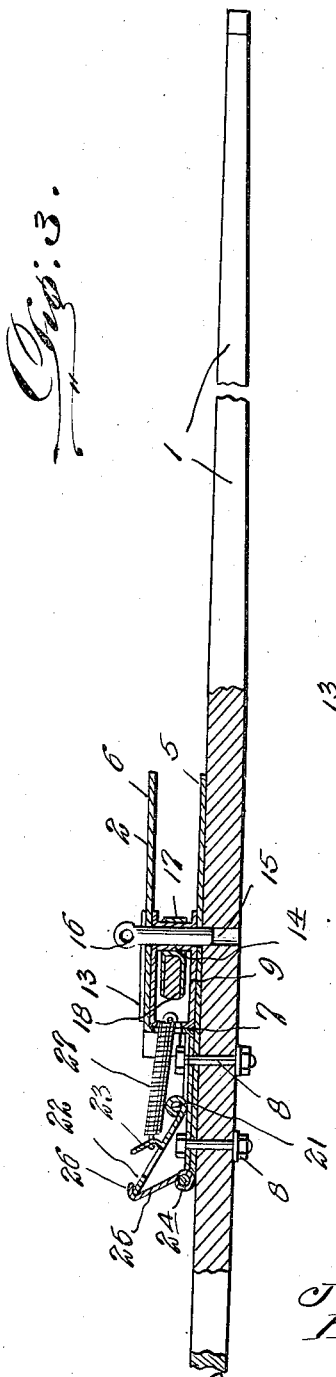
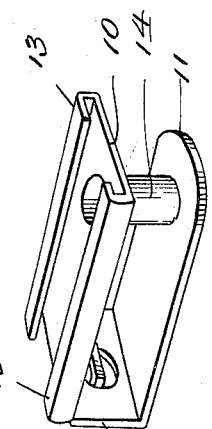
Witnesses:

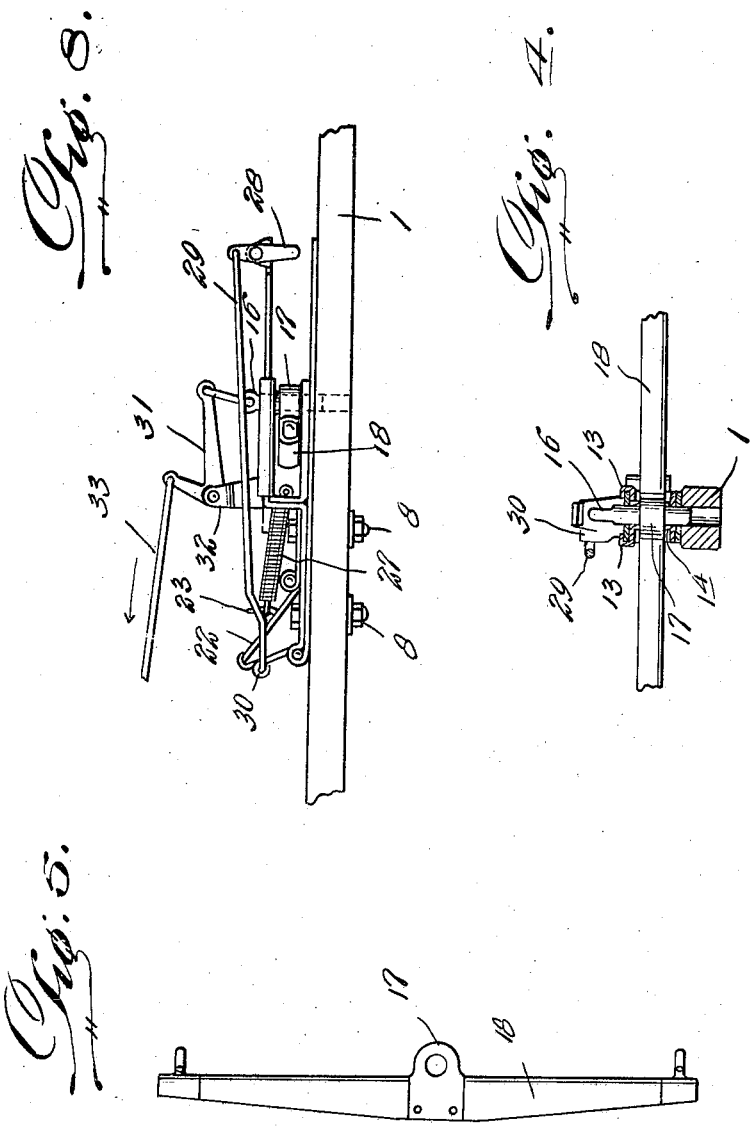

Patented May 27, 1924.

1,495,375

UNITED STATES PATENT OFFICE.

JONAS B. WOOD AND HARRY H. WOOD, OF OTO, IOWA.

SAFETY HITCH.

Application filed July 6, 1922. Serial No. 573,210.

*To all whom it may concern:*

Be it known that we, JONAS B. WOOD and HARRY H. WOOD, citizens of the United States, residing at Oto, in the county of Woodbury and State of Iowa, have invented new and useful Improvements in Safety Hitches, of which the following is a specification.

In carrying out the present invention it is our purpose to provide a safety hitch whereby the draft animals may be connected to the vehicle in order to draw the vehicle along and which will be so constructed as to enable the animals to have a certain freedom of movement without influencing the vehicle when the animals are resting.

It is also our purpose to provide a safety hitch which will automatically disconnect the animals from the vehicle in the event of the animals attempting to run wild, thereby prevent damage to the vehicle and its occupants.

A further object of our invention is the provision of a safety hitch which will be under the control of the driver of the vehicle, so that in the event of the animals attempting to run wild the driver may release the hitch, in order to permit the animals to run free of the wagon or other vehicle.

We also aim to provide a safety hitch which will embrace the desired features of efficiency, simplicity and durability, which will operate efficiently and effectively under all conditions and wherein the component parts will be so arranged and corelated as to reduce the possibility of derangement to a minimum.

With the above recited objects in view, and others of a like nature, the invention resides in the construction, combination and arrangement of parts set forth in and falling within the scope of the appended claims.

In the accompanying drawings:

Figure 1 is a plan view of our improved safety hitch applied to a wagon tongue.

Figure 2 is a side elevation of the same.

Figure 3 is a longitudinal sectional view therethrough.

Figure 4 is a sectional view on the line 4—4 of Figure 1.

Figure 5 is a plan view of the double tree.

Figure 6 is a perspective view of a detail of the invention.

Figure 7 is a similar view of another detail of the invention.

Figure 8 is a side elevation showing a modified construction.

Referring now to the drawings in detail, 1 designates a wagon tongue having one end connected to the running gear of the wagon in the usual well known manner. Mounted upon the wagon tongue immediately in advance of its connection with the running gear is our improved safety hitch. This safety hitch embodies a yoke 2 which, in the present instance, is formed of a single length of metal bent upon itself between its ends to provide a pivot sleeve 3 at its bight, superimposed securing sections 4 contiguous to the bight and lying in face to face contact and a lower jaw 5 and upper jaw 6 spaced apart from the lower jaw, the material of the upper securing section being bent upwardly at right angles to itself, as at 7, to hold the upper jaw spaced apart from the lower jaw. The securing sections are formed with bolt holes that aline with similar holes in the tongue and through these bolt holes are passed securing bolts 8 that hold the yoke securely to the tongue. The jaws 5 and 6 of the yoke open outwardly toward the outer end of the tongue, as clearly shown in Figures 2 and 3 of the drawings. Within the jaws 5 and 6 is a carriage 9 of substantially U-shape and comprising top and bottom members 10 and 11, respectively, and an end section 12 interconnecting the top and bottom members of the U-shaped carriage. The top and bottom members of the carriage lie in face to face contact with the inner surfaces of the jaws 6 and 5, respectively, and the top member 10 of the carriage is formed with upwardly and inwardly turned flanges 13 at its respective side edges that engage over the side edges of the top jaw 6 of the yoke 2, so that the carriage may slide within the yoke, as will hereinafter appear. Adjacent to the forward end of the carriage the top and bottom members 10 and 11 are formed with alining openings, and secured within these openings is a sleeve 14 that alines normally with openings in the jaws 5 and 6 and with an opening 15 in the tongue. Through these alining openings and the sleeve 14 is passed a king bolt 16. Surrounding the sleeve 14 is a clevis 17 connected with the double tree 18 at the center of such double tree. This double tree extends through the carriage behind the king bolt and at right angles to the tongue, as clearly illustrated in Figures 1, 2 and 3 of the drawings, and on the outer end of the double tree are the usual single trees 19 arranged respectively on opposite sides of the tongue, in order that the draft animals may be connected to the vehicle equipped with the tongue.

Also secured to the top securing section of the yoke 2 by one of the bolts 8 is a plate 20 and formed in the plate 20 is an eye 21 in which is pivoted one end of a latch member 22 that projects upwardly and rearwardly from the plate 20, as shown in Figures 2 and 3 of the drawings. Stamped out of the member 22 is a lug 23 and passed through the pivot sleeve 3 is a pivot bolt 24 upon which is pivoted one end of a keeper 25, the upper end of which is formed with a hook 26 that is normally engaged by the rear end of the latch member 22, 27 indicates a retractile spring, one end of which is fastened to the lug 23 and the other end of which extends through the yoke 2 and is connected with the end section 12 of the carriage.

Pivotally mounted between its ends upon the forward end portion of the top jaw 6 of the yoke is a lever 28, the lower end of which is arranged in the path of the carriage and the upper end of which is connected by means of a link 29 to the keeper 25, as at 30, so that when the lever 28 is swung about its pivotal connection with the jaw 6, motion will be transmitted to the link 29 to the keeper plate 25 to relieve the latch member 22 of the influence of the keeper, thereby permitting the carriage to be pulled out of the yoke in the event that the king bolt 16 is removed.

In practice, the parts are normally in the position shown in Figures 1, 2 and 3 of the drawing, so that a rigid connection is effected between the double tree and the wagon tongue, thereby permitting the draft animals to exert a direct pull upon the vehicle. When, however, it is desired to permit the animals to have a certain freedom of movement, as when the vehicle is stopped, the king bolt is withdrawn and this permits the carriage to have a sliding movement within the yoke 2, but this movement of the carriage is limited by the contractile spring 27. Should the animals run wild and attempt to pull the carriage out of the yoke, then the carriage will drop the lever 28 and through the link 29 swing the keeper 25 to release the latch member 22, thereby releasing the spring 27 from the lug 23, so that the carriage may be pulled out of the yoke and the animals permitted to run free of the vehicle.

In the construction shown in Figure 8 of the drawings, the upper end of the king bolt 16 is connected with one end of a bell crank lever 31 pivoted at its bight on a bracket 32. The other end of the bell crank lever is connected by means of a rod 33 with a hand lever that is disposed within convenient reach of the driver of the vehicle, so that the driver may release the king bolt in the event of the animals attempting to run wild while the vehicle is in motion, thereby permitting the animals to run free of the vehicle.

We have entered into a detailed description of the construction and relative arrangement of parts embraced in the present and preferred embodiment of our invention with a view to imparting a full, clear and exact understanding of the said embodiment. We do not desire, however, to be understood as confining ourselves to the said specific construction and relative arrangement of parts, inasmuch as in the future practice of our invention such changes or modifications may be made as fairly fall within the scope of our invention as defined by our appended claims.

Having thus described the invention, what we claim as new, is:—

1. In a safety hitch for horse drawn vehicles, the combination with a tongue, of a rigid yoke rigidly fastened on the tongue and having an open outer end, a carriage within said yoke, a double tree pivoted to said carriage, means holding said carriage to said yoke and operable to release the carriage, so that the double tree and carriage may be pulled out of the yoke, and means attached to said carriage for holding it within the yoke upon the release of said first named means and yieldable to permit the carriage to have a limited forward movement within the yoke.

2. In a safety hitch for horse drawn vehicles, the combination with a tongue, of a rigid yoke rigidly fastened on the tongue and having an open outer end, a carriage within said yoke, a double tree pivoted to said carriage, means holding said carriage to said yoke and operable to release the carriage, so that the double tree and carriage may be pulled out of the yoke, means attached to said carriage for holding it within the yoke upon the release of said first named means and yieldable to permit the carriage to have a limited forward movement within the yoke, and means in the path of movement of the carriage and controlling said second named means to relieve the carriage of the influence thereof for permitting the movement of the carriage out of the yoke.

3. In a safety hitch for horse drawn vehicles, the combination with a tongue, of a rigid yoke rigidly fastened on the tongue and having an open outer end, a carriage within said yoke, a double tree pivoted to said carriage, means holding said carriage to said yoke and operable to release the carriage, so that the double tree and carriage may be pulled outwardly of the yoke, and resilient means attached to said carriage and holding the same within the yoke upon the release of said last named means and yieldable to permit limited forward movement of the carriage relative to the yoke.

4. In a safety hitch for horse drawn vehicles, the combination with a tongue, of a rigid yoke rigidly fastened on the tongue and having an open outer end, a carriage within said yoke, a double tree pivoted to said carriage, means holding said carriage to said yoke and operable to release the carriage, so that the double tree and carriage may be pulled outwardly of the yoke, resilient means attached to said carriage and holding the same within the yoke upon the release of said last named means and yieldable to permit limited forward movement of the carriage relative to the yoke, and means operable by the carriage upon forward movement thereof for relieving the same of the influence of said resilient means.

In testimony whereof we affix our signatures.

JONAS B. WOOD.
HARRY H. WOOD.